2,899,443

PROCESS OF PREPARING CERTAIN HALOGENATED 1,3-DISUBSTITUTED-5-PYRAZOLONES

Heinz Schulze, Cincinnati, Ohio, assignor to General Aniline & Film Corporation, New York, N.Y., a corporation of Delaware No Drawing. Application July 7, 1958
Serial No. 746,665

9 Claims. (Cl. 260—310)

This invention relates to a method of preparing halogenated 1-phenyl-3-substituted-5-pyrazolones. It relates more particularly to a method of directly halogenating an aryl group in pyrazolones carrying a phenyl or a substituted phenyl group in the 1-position and an aliphatic or aromatic amino or amino group in the 3-position.

The use of halogenated pyrazolones as couplers in color photography is well-known having been described in U.S. Patent 2,600,788. These compounds are derivativies of 3-amino-1-phenyl-5-pyrazolone wherein the phenyl group contains two or more halogen atoms. It is claimed that these compounds have improved stability to light and heat when incorporated in a sensitive emulsion layer, yield magenta dyes that absorb less blue light than similar couplers and have a maximum absorption shifted towards the longer wave lengths. Said pyrazolone couplers were prepared by condensing dihalo- or trihaloarylhydrazines with ethyl-$\beta$-ethoxy-$\beta$-iminopropionate to form an ethyl-$\beta$-(haloaryl)hydrazine-$\beta$-iminopropionate followed by ring closure of the latter with sodium ethoxide.

It has now been discovered that an aryl group in 5-pyrazolones can be halogenated by subjecting 1-phenyl-3-substituted-5-pyrazolones having an amino group in the 3-position or an amino group on a carbon atom of the phenyl ring in the 1-position to direct halogenation followed by reduction in order to replace with hydrogen the halogen atoms which enter the unsubstituted methylene group in 4-position during said direct halogenation. The presence of the amino group in the parent pyrazolones is critical to this procedure since such a group activates the aryl rings which are destined for halogenation.

It is accordingly the object and purpose of this invention to provide a method of directly halogenating the aryl groups in the aforesaid 5-pyrazolones. This application is a continuation-in-part of applicant's Serial Number 619,955, filed November 2, 1956, now abandoned.

The halogenated pyrazolones contemplated herein can be represented by the following general formula:

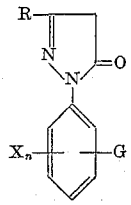

wherein R represents an alkyl group, e.g., methyl, ethyl, propyl, isopropyl, butyl, etc.; a phenyl group, e.g., phenyl, chlorophenyl, dichlorophenyl, trichlorophenyl, bromophenyl, dibromophenyl, tribromophenyl, etc.; an amino group, an alkylamino group, e.g., methylamino, ethylamino, propylamino, n-butylamino, etc.; phenylamino, e.g., chlorophenylamino, dichlorophenylamino, trichlorophenylamino, bromophenylamino, dibromophenylamino, tribromophenylamino, etc.; aliphatic acylamino, i.e., acetylamino, e.g., propionylamino, butyrylamino, etc.; benzoylamino, e.g., chlorobenzoylamino, dichlorobenzoylamino, trichlorobenzoylamino, bromobenzoylamino, dibromobenzoylamino, tribromobenzoylamino, etc.; X represents a halogen atom such as chlorine or bromine, n is a positive integer of from 1 to 3 and G is hydrogen, —$NR_1R_2$, wherein $R_1$ and $R_2$ can be hydrogen, an alkyl group, i.e., methyl, ethyl, n-propyl, n-butyl, etc., and a phenyl group.

5-pyrazolones containing halogenated aryl groups falling within the ambit of the above formula are formulistically depicted below:

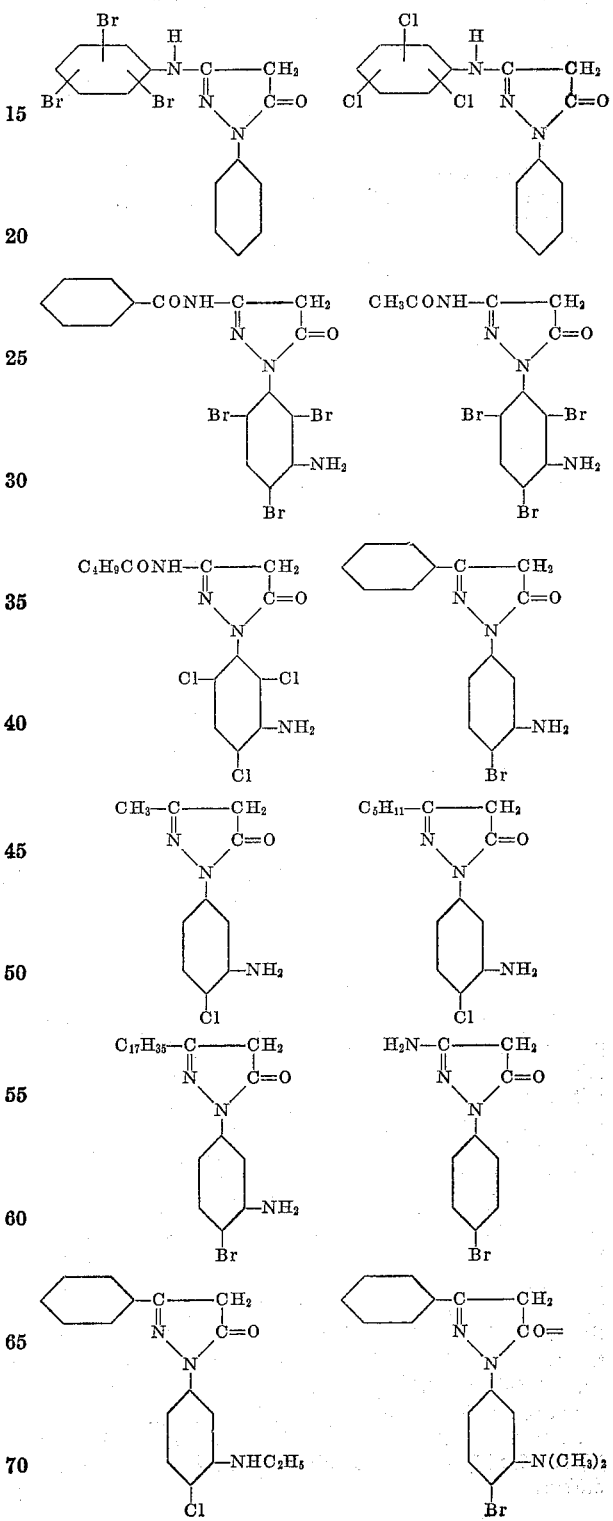

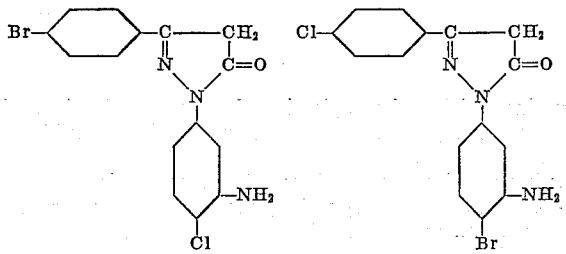

The halogenated 1,3-disubstituted-5-pyrazolones of the type described herein are generally prepared by suspending the appropriate 1-phenyl-5-pyrazolone in an acidic medium such as acetic acid followed by direct halogenation at room temperature. The resulting halogenated product is then reduced in acid media such as acetic acid in order to replace the halogen atoms at the 4-position with hydrogen atoms with subsequent regeneration of the $CH_2$ grouping while leaving the halogen on the aryl ring unaffected.

The direct halogenation step may be carried out using either elementary bromine or chlorine.

Suitable reducing agents for removal of the halogen atoms from the methylene group of the pyrazolone include iron and acetic acid or stannous chloride and hydrochloric acid.

An advantage of the process disclosed in the present invention is that it makes available haloaryl-5-pyrazolones which cannot be prepared or are very difficult to prepare by the prior art method, i.e., by condensation of a halohydrazine with the requisite β-ethoxy-β-iminopropionic ester.

The following examples will serve to illustrate this invention but it is to be understood that the invention is not limited thereto.

*Example I*

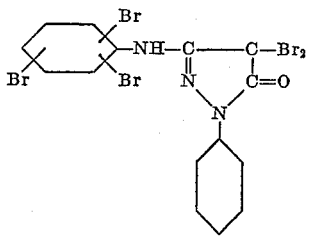

2.51 grams (0.01 mol) of 3-phenylamino-1-phenyl-5-pyrazolone were suspended in 75 ml. of acetic acid. With stirring, 0.06 mol (3.1 ml.) of bromine were added within five minutes. After stirring for another five minutes at room temperature, the solution was heated to reflux for 45 minutes. During the refluxing time, hydrogen bromide escaped through the condenser. A crystalline precipitate appeared after about 20 minutes. The reaction mixture was cooled, the precipitate filtered and washed with 20 ml. of acetic acid. Yield: 6 g. of yellow brown crystals. After recrystallization from acetic acid, the compound melted at 202–203° C. (with decomposition). Although the position of the bromine atoms attached to the phenyl ring in the above formula has not been definitely established, I am confident, however, that they occupy the 2, 4, and 6-position of said ring.

*Analysis.*—Calculated for $C_{15}H_8ON_3Br_5$: C, 27.9%; H, 1.23%; N, 6.5%. Found: C, 28.04%; H, 1.58%; N, 6.62%.

*Example II*

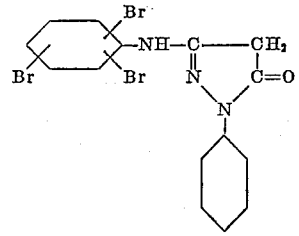

*Reduction.*—2.64 grams (0.004 mol) of the product from Example I, 25 ml. of acetic acid and 3 g. of iron filings were rapidly stirred on a steam bath for 30 minutes. After addition of 10 ml. of water, the stirring was continued for another 15 minutes. Then, 90 ml. of water were added and the mixture cooled in ice. The insoluble material was filtered, washed with water and extracted with a hot mixture of 50 ml. of 1 N sodium hydroxide and 300 ml. of water. The extract was acidified with acetic acid, cooled in ice and the precipitate filtered, washed with water and dried. Yield: 1.65 g. The compound melted at 249–250° C. (with decomposition) after recrystallization from acetic acid.

*Analysis.*—Calculated for $C_{15}H_{10}ON_3Br_3$: C, 36.92%; H, 2.07%; N, 8.61%. Found: C, 37.12%; H, 2.16%; N, 8.62%, 8.80%.

A film strip was developed for 10 minutes in a conventional color developer containing the above coupler and N-ethyl-N-hydroxyethyl-p-phenylenediamine. After bleaching and fixing of the residual silver and silver halide, a magenta dye with an absorption maximum at 534 mμ was formed.

*Example III*

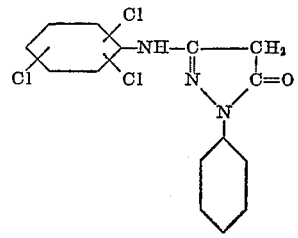

5.02 grams (0.02 mol) of 3-phenylamino-1-phenyl-5-pyrazolone were stirred in 60 ml. of acetic acid and saturated with chlorine. The temperature rose to 55° C. and a clear solution was formed. Later, a crystalline precipitate appeared. After about 1 hour, the temperature had dropped to 40° C. The excess of chlorine was removed by bubbling carbon dioxide through the solution. 10 grams of iron filings and 5 ml. of water were added and the mixture stirred rapidly on a steam bath for 1 hour. Then, the contents of the flask was added to 200 ml. of ice water. The insoluble material was filtered, washed neutral with water, and extracted with a hot mixture of 50 ml. of 1 N sodium hydroxide and 150 ml. of alcohol. The extract was acidified with acetic acid and the alcohol evaporated. The residue was cooled in ice, filtered and washed with water. Yield: 6.1 g. It was recrystallized from acetic acid whereby a small insoluble residue remained which was filtered. The compound melted at 255–256° C. (with decomposition).

*Analysis.*—Calculated for $C_{15}H_{10}ON_3Cl_3$: C, 50.80%; H, 2.82%; N, 30.10%. Found: C, 50.86%; H, 2.77%; N, 29.69%.

On color development as in Example I, a magenta dye with an absorption maximum at 532 mμ was formed.

Example IV

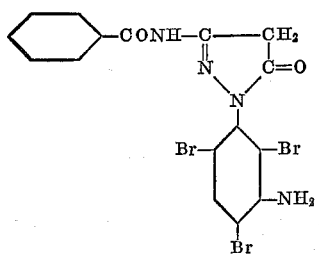

5.88 grams (0.02 mol) of 3-benzoylamino-1-(3'-aminophenyl)-5-pyrazolone, 20 g. of sodium acetate (with 3 mol of water of crystallization) were suspended with stirring, in 150 ml. of acetic acid. In five minutes, a mixture of 6.2 ml. (0.12 mol) of bromine in 60 ml. of acetic acid was added. A clear solution was formed. It was stirred for another 30 minutes at room temperature, followed by 15 minutes at 85° C. and poured into 500 ml. of ice water. The precipitated material was collected on a filter, washed with several 100 ml. of water and dried. Yield: 12.8 g. of a cream colored solid. It decomposes above 150° C.

The crude perbromide was suspended in 100 ml. of acetic acid with stirring and cooled to 18° C., 2 ml. of hydrochloric acid were added, followed by 9.7 g. (0.043 mol) of stannous chloride (with 2 mol water of crystallization) dissolved in 13 ml. of hydrochloric acid. The stannous chloride was added within 6 minutes with good cooling with ice from the outside. The temperature did not exceed 22° C. during the addition. After an overall stirring time of 25 minutes, the mixture was poured into 100 ml. of water and 300 g. of ice. The precipitated white solid was filtered, washed with 500 ml. of water and dissolved in 100 ml. of 2 N sodium carbonate. Filter-cell was added and the solution was filtered. The clear filtrate was acidified with acetic acid and cooled in ice. The precipitated product was filtered, washed with water and dried. Yield: 7.5 g., M.P. 257–260° C. The crude material crystallized very well from toluene and melted at 260–261° C. After crystallization from 60% acetic acid, the compound melted at 274° C. (with decomposition).

*Analysis.*—Calculated for $C_{15}H_{11}ON_4Br_3$: C, 36.15%; H, 2.07%; Br, 45.2%. Found: C, 36.15%; H, 2.12%; Br, 42.92%, 43.03%, 43.73%.

A sample of the above compound was dissolved in 25 ml. of water to which 2 ml. of 6 N sodium hydroxide (excess) had been added. The solution was boiled under reflux for 1 hour and acidified with nitric acid. No turbidity or precipitate appeared on addition of silver nitrate. On color development as in Example I, a magenta dye with an absorption maximum at 546 mμ was formed.

The 3-benzoylamino-1-(3'-aminophenyl)-5-pyrazolone, employed above, was prepared by known procedures from ethyl monoiminomalonate and 3-nitrophenyl-hydrazine giving 3-amino-1-(3'-nitrophenyl-5-pyrazolone) M.P. 247–248° C. (with decomposition). Benzoyl derivative: M.P. 210° C. Reduction with iron gave 3-benzoylamino-1-(3'-aminophenyl)-5-pyrazolone; M.P. 220° C. from propanol.

Example V

The same procedure was followed as above for Example IV but replacing 3-benzoylamino-1-(3'-aminophenyl)-5-pyrazolone with 3-propionylamino-1-(3'-aminophenyl)-5-pyrazolone.

Example VI

The same procedure was followed as above for Example IV but replacing 3-benzoylamino-1-(3'-aminophenyl)-5-pyrazolone with 3-stearamido-1-phenyl-5-pyrazolone.

Example VII

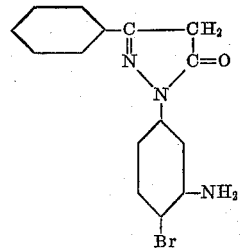

2.51 grams (0.01 mol) 3-phenyl-1-(3'-aminophenyl)-5-pyrazolone (M.P. 139 C.) were dissolved in 175 mls. of acetic acid with stirring. Within 5 minutes, 3.1 mls. (0.06 mol) of bromine in 25 mls. of acetic acid were added. A bright yellow solid precipitated. After stirring for another two hours at room temperature the precipitate was filtered. Yield: 3.9 grams. It was suspended in 50 mls. of acetic acid to which 1 ml. of hydrochloric acid was added. 4.5 grams (0.02 mol) stannous chloride (with 2 mols of water of crystallization) dissolved in 6 mls. of HCl were gradually added with ice cooling so that the temperature remained below 20° C. After stirring, for another ten minutes, the mixture was poured into 200 mls. of water and 100 grams of ice, filtered, and washed with ice water. The filter cake was dissolved in 36 mls. of hot 2 N sodium carbonate, filter-cell added, and the mixture filtered hot. The filtrate was acidified with acetic acid, cooled, filtered and washed. Yield: 2 grams. After recrystallization from 50% acetic acid the compound melted at 201° C. (with decomposition). The analysis indicates that the compound contains one bromine atom and corresponds to the above formula.

*Analysis.*—Calculated for $C_{15}H_{12}ON_3Br$: C, 54.6%; H, 3.64%; N, 12.72%; Cl 24.2%. Found: C, 54.27%; H, 3.97%; N, 12.58%; Cl, 22.41%.

A filmstrip developed with the above product as in Example I gave a magenta dye with a maximum absorption at 547 mμ and a second maximum at 452 mμ.

Example VIII

The procedure was followed as given in Example VII except that the 3-phenyl-1-(3'-aminophenyl)-5-pyrazolone was replaced by 1-(3'-aminophenyl)-3-heptadecyl-5-pyrazolone.

Example IX

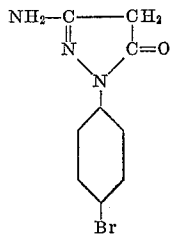

17.5 grams (0.1 mol) 3-amino-1-phenyl pyrazolone were dissolved with stirring in 55 mls. of sulfuric acid with slight cooling, so that the temperature did not exceed 30° C. After cooling to 10° C., 15.36 ml. (0.3 mol) of bromine were added gradually within about 30 minutes. During the addition, the temperature was kept at 10–12° C. After stirring for another three hours at ordinary temperature, excess bromine was removed by blowing $CO_2$ through the solution. The reaction mixture was poured out into 500 grams of ice and 60 grams of sodium chloride. The precipitate formed was filtered and washed with a large quantity of water to remove excess acid. The filter cake was gradually added to 200 mls. of acetic acid and 30 grams of iron filings with stirring. The mixture was heated on a steambath for one hour with rapid stirring. Acetic acid was removed in vacuum on a steambath, and 100 mls. of water was added. The precipitate was broken up, filtered, and washed with water. The residue was extracted with 200 mls. of 1 N sodium hydroxide, filtered hot and acidified with acetic acid. After cooling in ice, the precipitate was collected on a filter, washed with water and recrystallized from 6 N acetic acid giving 13.95 grams of 3-amino-1-bromophenyl pyrazolone; M.P. 163–165° C. After recrystallization from 6 N acetic acid, the melting point increased to 167–168° C. Presumably, the bromine atom is in the 4-position phenyl ring as shown in the above formula.

*Analysis.*—Calculated for $C_9H_8ON_3Br$: C, 42.6%; H, 3.15%; Br, 31.5%. Found: C, 42.54%; H, 3.23%; Br, 31.28%.

The above product can be reacted with a diffusion inhibiting group, i.e., sodium-α-sulfostearic acid according to patent application, Serial No. 580,729, filed April 26, 1956, to give a non-diffusing color former which can be incorporated into a photographic silver halide emulsion. On coating, exposure and color development in an N-ethyl, N-hydroxyethyl-p-phenylene diamine color developer, a magenta dye is formed which has an absorption maximum at 537 mμ.

Alternatively, the condensation product with sulfostearic acid can be coupled with diazotized 5-N-ethyl, N-hydroxyethyl, 2-amino toluene to give a magenta azo filter dye with an absorption maximum at about 527 mμ, which decolorizes easily in the conventional ferricyanide bleaches used in color photography.

*Example X*

The procedure was followed as given in Example IX except that the 3-amino-1-phenyl-5-pyrazolone was replaced with 3-ethylamino-1-(3'aminophenyl)-5-pyrazolone.

*Example XI*

The procedure was followed as given in Example IX except that the 3-amino-1-phenyl-5-pyrazolone was replaced with 3-heptadecylamino-1-(3'-aminophenyl)-5-pyrazolone.

I claim:

1. A process of halogenating the aryl groups in a 5-pyrazolone which comprises treating a pyrazolone of the following general formula:

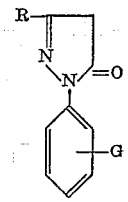

wherein R is selected from the class consisting of alkyl, phenyl, benzoylamino, amino, alkylamino and phenylamino, and G is selected from the class consisting of hydrogen, acylamino, amino, alkylamino and dialkylamino, wherein one of said radicals, R and G, always being one of said amino groups with a sufficient quantity of halogen in a solvent therefor so as to introduce two atoms of halogen on the carbon atom in the 4-position and at least one atom of halogen in an aryl ring, and selectively removing the halogen atoms from the 4-position by reduction.

2. A process according to claim 1 wherein the solvent is acetic acid.

3. A process according to claim 2 wherein iron and acetic acid are used in the reductive hydrogenation.

4. A process according to claim 2 wherein stannous chloride and hydrochloric acid are used in the reductive hydrogenation.

5. A process according to claim 2 wherein one molar equivalent of pyrazolone is treated with more than 6 mols of halogen.

6. A process according to claim 2 wherein the halogenating agent is chlorine.

7. A process according to claim 2 wherein one molar equivalent of pyrazolone is treated with more than 6 mols of chlorine.

8. A process according to claim 2 wherein the halogenating agent is bromine.

9. A process according to claim 2 wherein one molar equivalent of pyrazolone is treated with more than 6 mols of bromine.

No references cited.